United States Patent [19]
Ludwig et al.

[11] Patent Number: 5,581,791
[45] Date of Patent: Dec. 3, 1996

[54] METHOD FOR TRANSMITTING HIGH-PRIORITY PROGRAMS AND DATA IN A COMMUNICATION SYSTEM

[75] Inventors: Josef Ludwig, Weicht; Karl Strahl, Gutenzell, both of Germany

[73] Assignee: Siemens Aktiengesellschaft, Munich, Germany

[21] Appl. No.: 35,976

[22] Filed: Mar. 23, 1993

[30] Foreign Application Priority Data

Mar. 27, 1992 [DE] Germany ............. 42 10 138.7

[51] Int. Cl.⁶ ................................................. G06F 13/10
[52] U.S. Cl. ................. 395/860; 395/872; 395/873; 370/462
[58] Field of Search ............................ 395/425, 325, 395/275, 650, 200, 872, 873, 860, 250, 200.01, 200.03, 200.07, 200.08, 200.13, 200.18; 340/825.07; 370/94.3, 85.1, 85.6, 112

[56] References Cited

U.S. PATENT DOCUMENTS

| | | | |
|---|---|---|---|
| 4,181,934 | 1/1980 | Marenin | 395/860 |
| 4,229,790 | 10/1980 | Gilliland et al. | 395/775 |
| 4,418,396 | 11/1983 | Hemdal et al. | 395/824 |
| 4,517,561 | 5/1985 | Burke et al. | 340/825.07 |
| 4,833,599 | 5/1989 | Colwell et al. | 395/650 |
| 4,922,416 | 5/1990 | Krishnan et al. | 395/200.07 |
| 5,038,282 | 8/1991 | Gilbert et al. | 395/200.01 |
| 5,138,615 | 8/1992 | Lamport et al. | 370/94.3 |
| 5,163,132 | 11/1992 | Dulac et al. | 395/873 |
| 5,193,189 | 3/1993 | Flood et al. | 395/650 |
| 5,313,590 | 5/1994 | Taylor | 395/311 |
| 5,452,452 | 9/1995 | Gaetner et al. | 395/650 |

*Primary Examiner*—Jack B. Harvey
*Assistant Examiner*—Ario Etienne
*Attorney, Agent, or Firm*—Hill, Steadman & Simpson

[57] ABSTRACT

A method for transmitting high-priority programs and data between a first function unit and a second function unit of a communication system, wherein computer programs and data having different priorities are transmitted from the first function unit to an address calculation process via a first message route and the second function unit accesses an output list administered by the address calculation process for address calculation and forwards the computer programs and data to peripheral equipment via message distributor units, including the steps of: writing into a buffer memory allocated to the first function high-priority programs and data of first control procedures sequencing in the first function unit via at least one additional message route; subsequently sending a first message from the first control procedures to second control procedures sequencing in the second function unit; initiating the second function unit to read-out the high-priority programs and data deposited in the buffer memory; and subsequently sending a second acknowledgement message from the second control procedures to the first control procedures.

13 Claims, 2 Drawing Sheets

METHOD FOR TRANSMITTING HIGH-PRIORITY PROGRAMS AND DATA IN A COMMUNICATION SYSTEM

BACKGROUND OF THE INVENTION

The invention generally relates to communication systems. More specifically, the invention relates to digital switching systems. Yet more specifically, the invention relates to arrangements for regulating traffic in digital switching systems.

Complex communication systems are usually realized as multi-processor systems. Multiprocessor systems can have advantages as compared to traditional mono-processor systems such as, for example, a marked increase in the processing speed. This increased processing speed is achieved by parallel processing of a plurality of tasks that respectively represent sub-tasks of a higher-ranking task; every processor works on a sub-task and the sub-results thereof are in turn combined to form an overall result for the higher-ranking task.

In order to accommodate the demands connected therewith, the internal system executions of a plurality of processors must be controlled and monitored. The complexity of the tasks and processors sequencing in a communication system is thus markedly increased. A complex interplay of software processes is thus necessary.

To produce order in such a complex interplay of processes, the individual processes usually have allocated to them what are referred to as priority levels. This means that only a process that momentarily has the highest priority level is allowed to sequence. Processes of a lower priority level are prevented from being executed until the processes of higher priority levels have been run.

The software of a communication system generally is composed of modularly structured, task-related software processes. These processes then generally are divided into switching dependability and operating applications processes.

The processes are then assigned to respective processors that assume the handling of the assigned tasks.

The switching applications and the dependability application processes generally have high priority levels. The dependability applications processes should sequence when units of the communication system have failed. In this case, measures for the elimination of occurring errors and for restoring the functionability of the appertaining units must be immediately initiated. For this reason, higher priority levels are allocated to the dependability applications processes than to the switching-oriented processes. Switching-oriented processes that are already sequencing are interrupted by dependability-oriented processes.

For dependability reasons, central processor units in particular are redundantly present in a communications system. Given outage of one central processor unit, thus, an immediate switch can be made to a redundant unit without incurring noteworthy losses in dynamics.

This is not the case with the peripheral equipment of a communication system. Due to the plurality of peripheral assemblies providing interfaces to terminal equipment, redundancy would be uneconomical. Since the peripheral equipment are not redundantly present, these assemblies must be monitored all the more exactly and the central processor units must be immediately informed of a total outage of a peripheral device. The central processor units can then in turn immediately initiate countermeasures, such as transmitting dependability-oriented programs/data from external storage units connected to the central units to the peripheral assemblies. There is the risk, however, that the momentarily sequencing processes of the switching applications will be displaced by the dependability-oriented processes executing the transmission of programs/data to the peripheral assemblies and, thus, the chronological execution of the switching-oriented processes will be delayed—particularly in times of a high switching-oriented workload, i.e. at times wherein a plurality of switching-oriented processes are sequencing and the processors and memory units assigned to them are burdened up to capacity. A displacement of the switching-oriented processes, however, is to be avoided under all circumstances since this can mean in practice that connections to be newly set up between two terminal subscribers cannot be set up in a system working at capacity.

This problem was resolved before by subjecting the dependability-oriented processes to what is referred to as a "timer control". A timer control ensures that a dependability-oriented process can only proceed to execution when a timer allocated to it has expired, this being usually reported by a "timer interrupt"; in this case, the switching-oriented processes are immediately interrupted since the higher prioritization of the dependability-oriented processes takes full effect. Such a procedure has the advantage that the switching-oriented processes sequence remain undisturbed during the "timer running" period and can only be interrupted by dependability-oriented processes upon "timer expiration".

This arrangement, however, is disadvantageous in that the transmission of programs and data of the dependability applications uses too much time since a transmission is only punctually implemented, i.e. respectively upon expiration of a timer; the demand for immediately initiated countermeasures in order to immediately place down units back into operation can thus be only conditionally met. Since, further, the processes implementing a transmission of switching-oriented/dependability-oriented program/data are controlled by the central processor units, this arrangement places an additional load on the central processor units when called to effect the foregoing.

SUMMARY OF THE INVENTION

The present invention provides a method by which programs and data having a high priority are transmitted from central processor units to peripheral units at high speed without influencing or impeding momentarily sequencing processes of lower priority in terms of their execution.

To this end, in an embodiment the invention provides a method for transmitting high-priority programs and data between a first function unit and a second function unit of a communication system, whereby computer programs and data having different priority are transmitted from the first function unit to an address calculation process via a first message route and the second function unit accesses an output list managed by the address calculation process for an address calculation and forwards the computer programs and data to peripheral equipment via message distributor units, comprising the steps of: writing into a buffer memory allocated to the first function unit high-priority programs and data of first control procedures sequencing in the first function unit via at least one additional message route; subsequently sending a first acknowledgement message from the first control procedures to second control procedures sequencing in the second function unit, initiating the second function unit to read-out the high-priority programs and data deposited in the buffer memory; and subsequently sending a second acknowledgement message from the second control procedures to the first control procedures.

What is critical for the invention is that additional message routes as well as buffer memories allocated to them (e.g., a memory area) are established between the central processor unit and peripheral units; programs and data having high priority can then be transmitted via these additional message routes.

To this end, in an embodiment, the invention provides that buffer memories are established in a memory, and the buffer memories are accessible by both the central processor units as well as the peripheral units. The program and/or data having high priority can thus be written into these buffer memories by the central processor units and can be read out and forwarded by processes of the peripheral units that have a lower workload. The control procedures required for this purpose are implemented via the traditional message routes.

In an embodiment of the invention, two additional message routes are provided, whereby a first buffer memory is allocated to the first additional message route and a second buffer memory is allocated to the second additional message route; and in a reading of the high-priority programs and data formed into data packets into the first buffer memory ensues concurrently with the read-out of data packets from the second buffer memory.

In an embodiment of the invention, the first acknowledgement message and the second acknowledgement message are transmitted via the first message route.

An advantage of the provision of the two additional message routes having correspondingly allocated buffer memories is that an alternation of the write/read processes is possible, and this can produce a marked increase in the transmission speed are connected therewith. It is there by taken into consideration that the programs be transmitted first and the data transmitted subsequently.

It is also advantageous that, first, the switching-oriented processes usually sequence undisturbed by the dependability-oriented processes and, second, the processes responsible for re-initialization of the system, given the case of a total outage of the communication system are transmitted far more quickly to the peripheral equipment, as a result whereof the total run-up time for the communication system is markedly shortened.

These and other advantages and features of the invention will be appreciated from the following detailed description with reference to the accompanying drawings.

DETAILED DESCRIPTION OF THE PRESENTLY PREFERRED EMBODIMENTS

Figure 1:
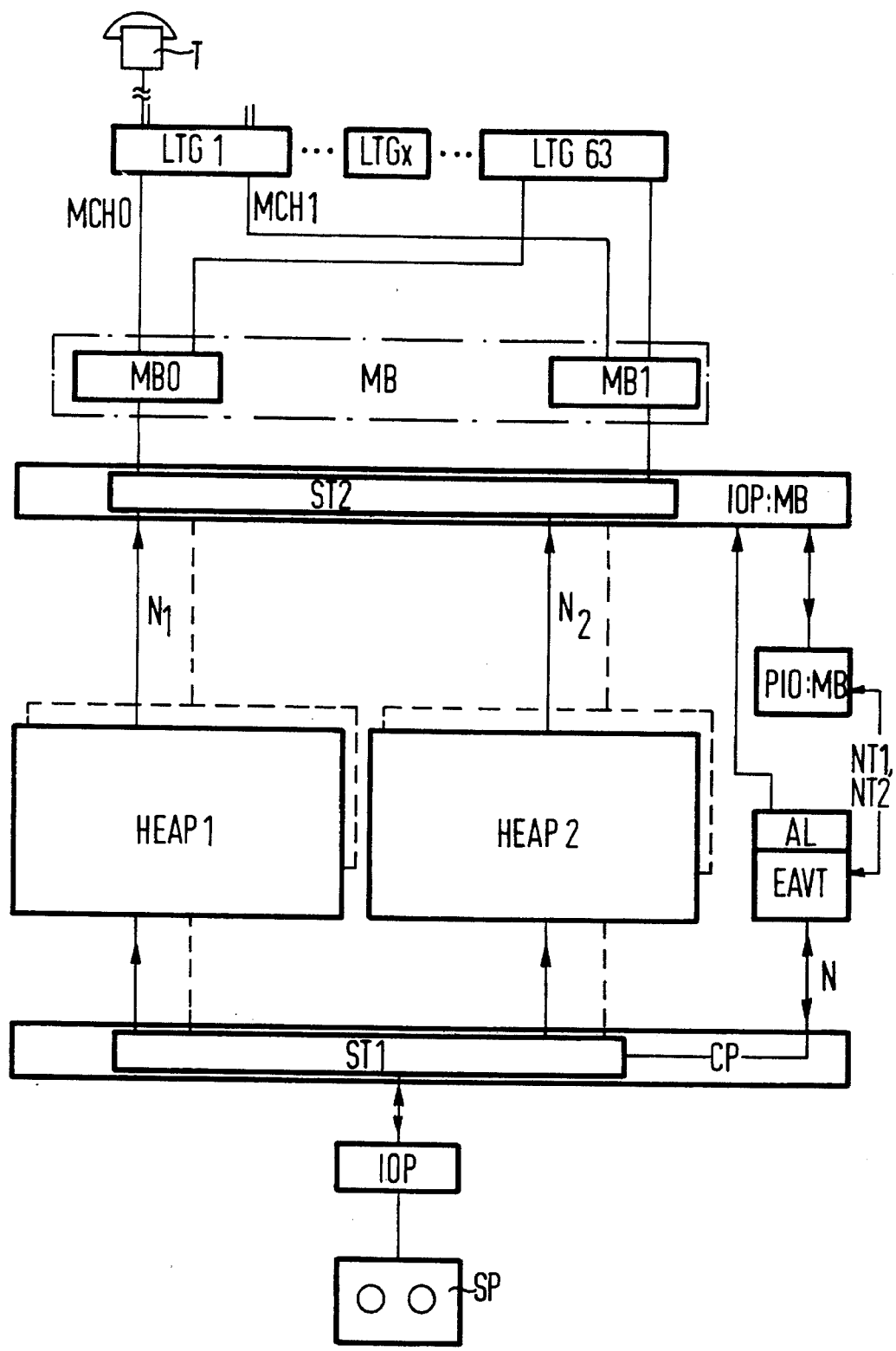
FIG. 1 illustrates a block diagram of a central processor unit and peripheral units, as well as the message routes appertaining thereto in a communication system embodying principles of the invention.

In accordance with the invention, a communications system is configured such that a memory is accessible by both the central processor unit and the peripheral assemblies so that they can separately access data stored therein, as needed. In FIG. 1, there is illustrated a data flow diagram for such a communication system KS.

The central component of the communication system KS is a coordination processor CP made up of a plurality of central processors. All signaling and through-connection events in the communication system KS are controlled and monitored by the coordination processor CP.

As also illustrated, peripheral units LTG1 . . . LTG63 having subscriber terminal equipment T connected thereto form part of the system KS. A total of 63 peripheral units LTG1 . . . LTG63 are represented in this exemplary embodiment and they are connected to message distributor unit MB (having message distributors MB0 and MB1) via two channels MCH0, MCH1.

The central processor of the coordination processor CP as well as the message distributors of the message distributor unit MB are redundantly present for dependability reasons, as discussed above.

The message distributors MB0, MB1 of the message distributor unit MB are connected to the central processors of the coordination processor CP via an interface unit IOP:MB. The communication of a coordination processor CP with the interface unit IOP:MB and with the peripheral units LTG1 . . . LTG63 is accomplished with the assistance of specific programs EAVT and PIO:MB that are provided in the form of software processes. In that regard, an output list AL is present in the program EAVT.

Further, external data storage means SP are connected to the coordination processor CP via suitable interface elements IOP. Among other things, programs and data for the dependability applications, switching applications, as well as procedures for calculating fee data or fee data themselves can be stored in this external storage means SP.

The messages of the switching applications are transmitted from the coordination processor CP to the software process EAVT via a message route N. The logical addresses necessary therefor are converted in the process EAVT into physical addresses for addressing the peripheral units LTG1 . . . LTG63. Further, the process EAVT stores these messages and addresses in the output list AL. From the latter, the processes of the interface unit IOP:MB can also access the output list AL and forward the messages contained in the output list AL to the message distributors MB0 and MB1 of the message distributor unit MB. The latter then in turn forwards the messages to the peripheral units LTG1 . . . LTG63 with the assistance of the addresses.

A function outage of a peripheral unit LTGx (i.e., one of the units LTG1 . . . LTG63) is immediately communicated to the coordination processor CP via known corresponding procedures. Control procedures (program) ST1 at the coordination processor CP immediately initiate suitable countermeasures.

Additional buffer memories HEAP1 and HEAP2 having two additional message routes N1 and N2, respectively, are provided in the memory of the coordination processor CP. The buffer memory HEAP1 is thereby allocated to the message route N1 and the buffer memory HEAP2 is allocated to the message route N2. The buffer memories HEAP1, HEAP2 can thus be addressed both by the coordination processor CP as well as by the interface unit IOP:MB. When a counter-measure is to be initiated, the control procedures ST1 in the coordination processor CP access the programs/data for the dependability applications located on the external storage means SP, convert them into data packets and write the data packets into the buffer memory HEAP1. Simultaneously, a message NTI is sent to the interface unit IOP:MB via the message route N. Information regarding the address of the buffer memory HEAP1 where the data packets are located, about the size of the data packets to be transmitted, about the length of the message header, etc., are contained in this message NT1. The message NT1 is accepted and interpreted by control procedures (program) ST2 of the interface unit IOP:MB.

In response thereto, the control procedures (program) ST2 begin to read out the data packets deposited in the buffer memory HEAP1 and to forward these to the specified appertaining peripheral units LTG1 ... LTG63. Meanwhile, the control procedures ST1 write further data packets into the buffer memory HEAP2. When the read-out of the first data packet from the buffer memory HEAP1 has ended, a message NT2 is immediately transmitted via the message route N from the interface IOP:MB to the control procedures ST1, whereupon the latter again write further data packets into this buffer memory HEAP 1, as needed. The data packets read out by the interface unit IOP:MB are forwarded to the respective peripheral units LTG1 ... LTG63.

Figure 2:
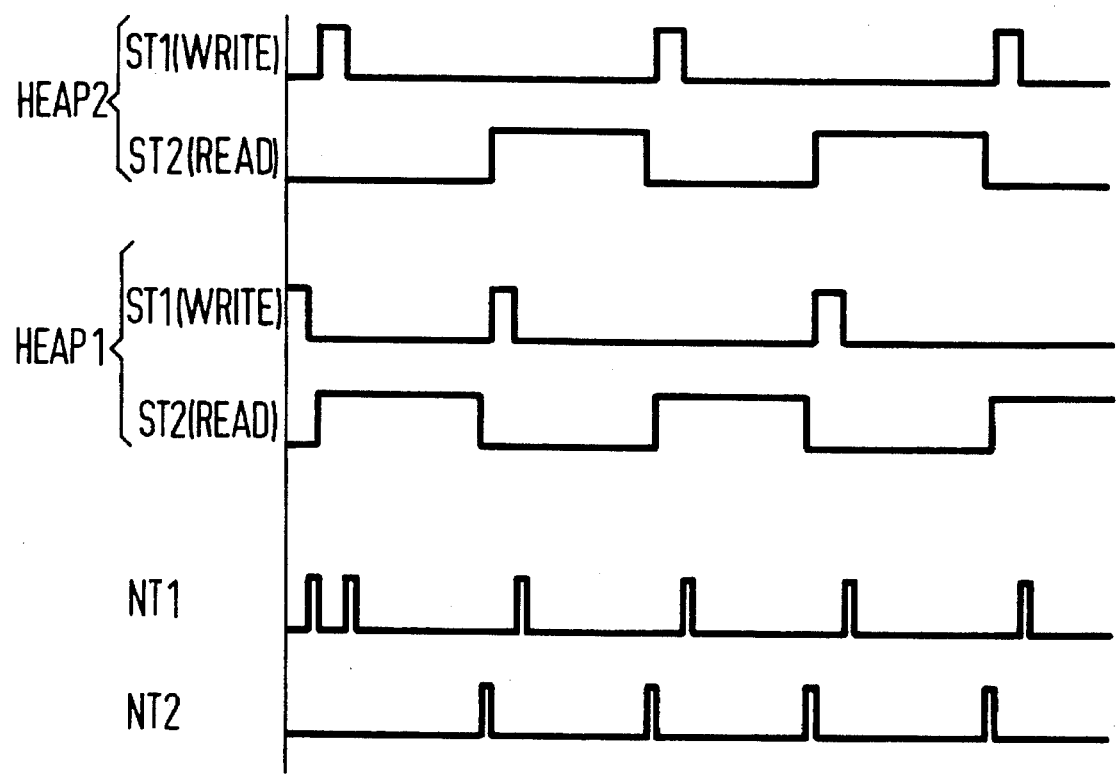
FIG. 2 illustrates a pulse diagram of the control signals for controlling the memory.

The chronological cycles characteristic of this write/read procedure are illustrated by means of the control pulses shown in FIG. 2.

As illustrated, the cyclical writing and reading of the buffer memories HEAP1 and HEAP2 in alternation continues until all data packets have been transmitted from the coordination processor CP to the interface units IOP:MB. It thereby proceeds such that the data packets of the programs are transmitted first and the data packets of the actual data are transmitted thereafter.

For the purposes of an example, assume the occurrence of a total outage of the communication system KS. In this case, program and/or data are transmitted from processes provided for this case to the peripheral units LTG1 ... LTG63 via the buffer memories HEAP1 and HEAP2. It is particularly provided for the total outage of the communication system KS that the method of the invention is repeatedly implemented in parallel. In practice, this represents a marked reduction in the total run-up time of the communication system.

Although modifications and changes may be suggested by those skilled in the art, it is the intention of the inventors to embody within the patent warranted hereon all changes and modifications as reasonably and properly come within the scope of their contribution to the art.

We claim:

1. A method for transmitting high-priority programs and data between a first function unit and a second function unit of a communication system, wherein at least low priority computer programs and data are transmitted from the first function unit to a process via a first message route and the second function unit accesses an output list administered by the process and then forwards the low priority computer programs and data to peripheral equipment via message distributor units, comprising the steps of:

writing the high-priority programs and data into a buffer memory allocated to at least one additional message route, said high-priority programs and data being accessed by first control procedures resident in the first function unit;

subsequently sending a message from the first control procedures resident in the first function unit to second control procedures resident in the second function unit to signal termination of writing;

initiating the second function unit to read-out the high-priority programs and data written into the buffer memory without interrupting sequencing of the low priority programs; and subsequently sending an acknowledgment message from the second control procedures to the first control procedures to signal termination of read-out of the high-priority programs and data from the buffer memory.

2. The method according to claim 1, wherein at least two additional message routes are provided, whereby a first buffer memory is allocated to the first additional message route and a second buffer memory is allocated to the second additional message route; and a reading of the high-priority programs and data formed into data packets into the first buffer memory ensues concurrently with the read-out of data packets from the second buffer memory.

3. The method according to claim 1, wherein the messages sent between the first and second control procedures are transmitted via the first message route.

4. The method according to claim 2, wherein the messages sent between the first and second control procedures are transmitted via the first message route.

5. The method of claim 1, wherein the low priority programs and data comprise communications system switching oriented programs and data.

6. The method of claim 1, wherein the high priority programs and data comprise communications system dependability oriented programs and data.

7. The method of claim 1, wherein the low priority programs and data comprise communications system switching oriented programs and data and the high priority programs and data comprise communications system dependability oriented programs and data.

8. A method for transmitting high-priority programs and data between a first function unit and a second function unit of a communication system, wherein at least low priority computer programs and data are transmitted from the first function unit to a process via a first message route and the second function unit accesses an output list administered by the process and then forwards the low priority computer programs and data to peripheral equipment via message distributor units, comprising the steps of:

writing the high-priority programs and data into a buffer allocated to at least one additional message route, said high-priority programs and data being accessed by first control procedures resident in the first function unit;

subsequently sending a message from the first control procedures resident in the first function unit to second control procedures resident in the second function unit to signal termination of writing;

initiating the second function unit to read-out the high-priority programs and data written into the buffer memory without interrupting sequencing of the low priority programs; and subsequently sending an acknowledgment message from the second control procedures to the first control procedures to signal termination of read-out of the high-priority programs and data from the buffer memory;

wherein at least two additional message routes are provided, whereby a first buffer memory is allocated to the first additional message route and a second buffer memory is allocated to the second additional message route; and a reading of the high-priority programs and data formed into data packets into the first buffer memory ensues concurrently with the read-out of data packets from the second buffer memory; and wherein the messages sent between the first and second control procedures are transmitted via the first message route.

9. The method of claim 8, wherein the low priority programs and data comprise communications system switching oriented programs and data.

10. The method of claim 8, wherein the high priority programs and data comprise communications system dependability oriented programs and data.

11. The method of claim 8, wherein the low priority programs and data comprise communications system switching oriented programs and data and the high priority programs and data comprise communications system dependability oriented programs and data.

12. A method for transmitting high-priority programs and data between a central processor unit and a message distributor interface unit, wherein at least low priority computer programs and data are transmitted from the central processor unit to a process via a first message route and a message distributor interface unit accesses an output list administered by the process and then forwards the low priority computer programs and data to peripheral equipment via message distributor units, the low priority programs and data comprising communications system switching oriented programs and data and the high priority programs and data comprising communications system dependability oriented programs and data, comprising the steps of:

writing the high-priority programs and data into a buffer allocated to at least one additional message route, said high-priority programs and data being accessed by first control procedures resident in the central processor unit;

subsequently sending a message from the first control procedures resident in the central processor unit to second control procedures resident in the message distributor interface unit to signal termination of writing;

initiating the message distributor interface unit to read-out the high-priority programs and data written into the buffer memory without interrupting sequencing of the low priority programs; and subsequently sending an acknowledgment message from the second control procedures to the first control procedures to signal termination of read-out of the high-priority programs and data from the buffer memory.

13. The method of claim 12, wherein at least two additional message routes are provided, whereby a first buffer memory is allocated to the first additional message route and a second buffer memory is allocated to the second additional message route; and a reading of the high-priority programs and data formed into data packets into the first buffer memory ensues concurrently with the read-out of data packets from the second buffer memory; and wherein the messages sent between the first and second control procedures are transmitted via the first message route.

\* \* \* \* \*